M. GRIMORD.
LIQUID FUEL STRAINER.
APPLICATION FILED FEB. 14, 1920. RENEWED AUG. 23, 1922.
1,432,687. Patented Oct. 17, 1922.
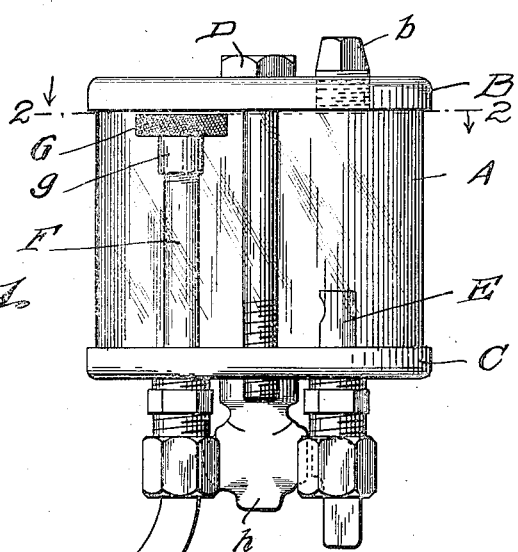
Fig.1.
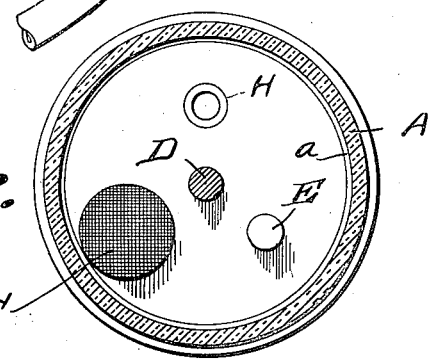
Fig.2.
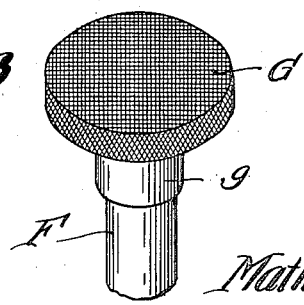
Fig.3.
Inventor
Mathew Grimord
By Beale & Park
Attorney
Witness
Adene Williams Patented Oct. 17, 1922.

1,432,687

UNITED STATES PATENT OFFICE.

MATTHEW GRIMORD, OF FOREST PARK, ILLINOIS.

LIQUID-FUEL STRAINER.

Application filed February 14, 1920, Serial No. 358,654. Renewed August 28, 1922. Serial No. 583,987.

*To all whom it may concern:*

Be it known that MATTHEW GRIMORD, citizen of the United States, residing at Forest Park, in the county of Cook and State of Illinois, have invented certain new and useful Improvements in Liquid-Fuel Strainers, of which the following is a specification.

My invention relates to water and sediment traps adapted more particularly for internal combustion or other engines using liquid fuel.

The object of my invention is to provide a trap composed of a minimum number of parts with transparent walls detachably connected by a single fastener, susceptible of affording ready access to the interior of the trap for purposes of cleaning the strainer; and an intake designed and arranged to facilitate flushing the bottom of the trap for the removal of sediment through the pet cock, and also arranged to deflect the inflow of said liquid directly to the floor of the trap.

In the accompanying drawings forming a part of this specification, Figure 1 is a side elevation.

Figure 2 is a horizontal section taken on line 2—2 of Figure 1.

Figure 3 is a detail perspective view of the strainer.

Referring more particularly to the drawings A denotes a cylindrical body portion of the trap made of glass. B denotes a detachable metal cover having a vent plug $b$; C denotes a like metal bottom closure, said cover and bottom closure being designed to enclose the ends of said cylindrical body. D denotes a headed bolt, threaded at its lower end and passes centrally through said cover, bottom, and intermediate cylindrical body, thus forming the trap of but three parts which are clamped together by the threaded bolt D. Suitable packing $a$ is used to form a tight union of the cover, bottom and body portion. E denotes a short inlet pipe, threaded at its outer end for connection in the feed line leading from a supply tank (not shown), while its inner end is closed at the top to baffle the upward flow of the liquid fuel and provided with a fuel feed opening at one side of the pipe near the floor (as shown in Fig. 1) from whence it will rise with equal pressure over the surface of the strainer hereinafter described. F denotes an outlet pipe having a threaded outer end for connection in the feed line to a carburetor (not shown). G denotes a wire strainer fitted to the inner end of the outlet pipe and detachably mounted thereto by means of a sleeve or collar $g$ forming part of the strainer and adapted to fit over and around the inner end of the outlet pipe. Said collar serves also as a purchase or handle to lift out the strainer for cleaning. H is the drain pipe having a pet cock $h$.

In operation the liquid fuel enters the trap through inlet pipe E and its flow is deflected to the floor of the trap whence it rises to the strainer which separates the water and floating sediment contained in the liquid fuel, confining the same to the lower portion of the trap, while the strained residue passes through the outlet pipe and thence to the carburetor. To remove sediment and water which collects in the lower portion of the trap vent plug $b$ is released, the pet cock is opened and the liquid fuel allowed to flush out the lower part of the trap, and particularly sediment from the flat floor of bottom C. Access to the strainer is readily afforded for purposes of cleaning by detaching bolt D and removing the cover B, when the strainer may readily be lifted out by grasping collar $g$.

Having shown and described my invention what I claim and desire to secure by Letters Patent is:

A trap of the class described, consisting of a transparent cylindrical body portion having a cover at its upper end provided with a vent, and a bottom closure having a flat floor, an inlet pipe closed at its upper end and positioned at one side of and near said floor and provided with a feed opening in one side positioned to direct the flow of fuel across the floor, a bolt passing centrally through and binding together the body portion and its cover and bottom, and means for connecting said trap in the fuel line.

In testimony whereof I affix my signature in the presence of two witnesses.

MATTHEW GRIMORD.

Witnesses:
FRANCIS J. WILSON,
JOHN KIRWAN.